US007423526B2

(12) United States Patent
Despotis

(10) Patent No.: US 7,423,526 B2
(45) Date of Patent: Sep. 9, 2008

(54) INTEGRATED PATIENT DIAGNOSTIC AND IDENTIFICATION SYSTEM

(76) Inventor: George J. Despotis, 12511 Elaine Dr., Des Peres, MO (US) 63131

( * ) Notice: Subject to any disclaimer, the term of this patent is extended or adjusted under 35 U.S.C. 154(b) by 664 days.

(21) Appl. No.: 11/153,941

(22) Filed: Jun. 16, 2005

(65) Prior Publication Data

US 2008/0030346 A1 Feb. 7, 2008

Related U.S. Application Data

(63) Continuation-in-part of application No. 10/353,873, filed on Jan. 29, 2003, now Pat. No. 6,922,148.

(51) Int. Cl.
*G09B 1/08* (2006.01)

(52) U.S. Cl. ............................ 340/539.12; 340/539.11; 340/539.23; 340/572.9; 340/573.4; 340/517; 600/300; 600/301; 600/306; 600/323; 600/382

(58) Field of Classification Search ............ 340/539.11, 340/539.12, 539.23, 572.9, 573.4, 517; 600/300–306, 600/323, 382, 500, 504
See application file for complete search history.

(56) References Cited

U.S. PATENT DOCUMENTS 3,978,318 A 8/1976 Rome
4,121,574 A 10/1978 Lester
4,154,011 A 5/1979 Rakestraw
4,164,320 A 8/1979 Irazoqui
4,512,096 A 4/1985 Heidecker
4,598,275 A 7/1986 Ross
4,783,917 A * 11/1988 Smith et al. ................... 40/633
4,812,823 A * 3/1989 Dickerson ................ 340/573.4
4,885,571 A * 12/1989 Pauley et al. ............. 340/573.4
4,914,843 A 4/1990 DeWoskin
4,939,652 A 7/1990 Steiner
4,952,928 A * 8/1990 Carroll et al. ............ 340/10.41
5,002,212 A 3/1991 Charleton
5,014,040 A 5/1991 Weaver
5,323,554 A 6/1994 MacDonald (Continued)

OTHER PUBLICATIONS

SG, "Mobile Medical Monitoring," Application Ideas, Nov. 2002, p. 22.

*Primary Examiner*—George A Bugg
*Assistant Examiner*—Son M Tang
(74) *Attorney, Agent, or Firm*—Todd S. Parkhurst, Esq.; c/o Hughes Socol Piers Resnick & Dym Ltd.

(57) ABSTRACT

A small integrated diagnostic and identification system is disclosed that solves several problems associated with current sensory systems. The diagnostic and identification system comprises a bracelet with an identification mechanism that is difficult to remove and has a lock. Further, the diagnostic and identification bracelet comprises a microprocessor which communicates with various physiologic sensors wherein said physiological sensors are substantially within said bracelet. Alternatively some of the sensors may be mounted outside the bracelet and means are provided for communicating data from the outside mounted sensors to the bracelet. The physiologic sensors either routinely, automatically monitor an individual's physiology or monitor the physiology based on a user request. The resulting physiology data from each sensor is combined via a single output and displayed on a display device. The present invention may be integrated with a record management system to share and store an individual's records.

30 Claims, 2 Drawing Sheets

U.S. PATENT DOCUMENTS

| | | | | |
|---|---|---|---|---|
| 5,343,608 | A | 9/1994 | MacDonald | |
| 5,704,097 | A * | 1/1998 | Rahav | 24/16 PB |
| 5,873,188 | A * | 2/1999 | Gehris | 40/633 |
| 5,917,407 | A | 6/1999 | Squire | |
| 5,973,598 | A * | 10/1999 | Beigel | 340/572.1 |
| 6,028,519 | A | 2/2000 | Dessureau | |
| 6,031,460 | A * | 2/2000 | Banks | 340/573.1 |
| 6,346,886 | B1 * | 2/2002 | De La Huerga | 340/573.1 |
| 6,348,867 | B1 * | 2/2002 | Myllymaki | 340/573.1 |
| 6,433,689 | B1 | 8/2002 | Hovind | |
| 6,491,647 | B1 * | 12/2002 | Bridger et al. | 600/585 |
| 6,725,075 | B2 * | 4/2004 | Al-Ali | 600/344 |
| 6,800,070 | B2 * | 10/2004 | Mazidji et al. | 604/147 |
| 6,934,570 | B2 * | 8/2005 | Kiani et al. | 600/324 |
| 7,039,449 | B2 * | 5/2006 | Al-Ali | 600/344 |
| 7,044,911 | B2 * | 5/2006 | Drinan et al. | 600/300 |
| 7,096,052 | B2 * | 8/2006 | Mason et al. | 600/310 |
| 7,132,944 | B1 * | 11/2006 | Kron et al. | 340/572.1 |
| 7,171,251 | B2 * | 1/2007 | Sarussi et al. | 600/324 |
| 7,204,425 | B2 * | 4/2007 | Mosher et al. | 235/492 |
| 7,240,446 | B2 * | 7/2007 | Bekker | 40/633 |
| 7,301,451 | B2 * | 11/2007 | Hastings | 340/539.12 |
| 2003/0208110 | A1 * | 11/2003 | Mault et al. | 600/300 |
| 2007/0073116 | A1 * | 3/2007 | Kiani et al. | 600/310 |
| 2007/0173705 | A1 * | 7/2007 | Teller et al. | 600/300 |

* cited by examiner

INTEGRATED PATIENT DIAGNOSTIC AND IDENTIFICATION SYSTEM

This application is a continuation-in-part of U.S. application Ser. No. 10/353,873, filed Jan. 29, 2003 now U.S. Pat. No. 6,922,148, which is incorporated herein by reference.

TECHNICAL FIELD OF THE INVENTION

The present invention relates, in general, to the field of patient identification devices. More specifically, the present invention is directed to a small, stand-alone patient identification device with diagnostic systems.

BACKGROUND OF THE INVENTION

As a result of advances in health care, hospitals and other care providers now have the ability to continually monitor a patient's physiology and overall condition. Currently, such facilities use EKGs, pulse oximeters, and other devices to continually monitor an individual's conditions. These sensory systems are invaluable in monitoring an individual's condition and administering the proper care. However, existing sensory systems exhibit several deficiencies.

More specifically, existing sensory systems are bulky and require considerable resources. For example, existing sensory systems such as capnometers, pulse oximeters, heart rate monitors, and other devices are large and typically contain several parts and wires. Consequently, they must be intentionally removed to gain access to the patient or to transport him or her. Additionally, it is well known that sensory devices such as heart rate sensor wires, oxygen monitors, etc. are inadvertently unhooked when a person shifts in his or her bed or seat. Finally, patients or family members frequently disconnect the sensory equipment because the patient is uncomfortable.

In addition, existing sensory devices display and/or print individual reports which must either be recorded at the time they are issued or retrieved and incorporated into an individual's records for subsequent retrieval. Moreover, some devices actually print or issue their reports at a remote location which must be later transported and added to an appropriate individual's chart. Unfortunately, test results or charts are occasionally assigned to a patient other than the patient whose data is on the chart or test results. This problem is especially exacerbated where multiple patients are housed together in the same room or during emergencies; situations where care must be especially taken to avoid patient misidentification. The same concerns are equally prevalent under non-emergency conditions. Moreover, one patient's charts can be inadvertently placed in another patient's room. As a result, individuals may be misdiagnosed or given incorrect treatment. In fact, there have even been incidents where surgeries are performed on the wrong patients.

Finally, patients, doctors, nurses or others remove current identification bands for several reasons. For example, patients cut or tear off the bands when they feel uncomfortable. As a result, doctors and nurses cannot identify the patient and are unable to associate the patient with his/her chart. In addition, doctors and hospital workers also cut the ID bands merely for their own convenience during insertion of intravenous or intra-arterial catheters or during surgery. Furthermore, doctors routinely remove the ID bands prior to procedures involving extremities or when blood flow to an extremity is compromised by swelling related to inflammation, burn or edema. When the procedure is completed they are inadvertently not reattached or cannot be reattached. Consequently, workers must rely on memory or educated guesses to recall a patient's identity and correctly associate the patient with his or her chart/history.

The present invention discloses a system which solves or at least substantially reduces the impact of these problems associated with existing sensory mechanisms and identification systems.

Specifically, there is a need for an integrated diagnostic and identification system which monitors physiological activities, stores the results, and correctly identifies a patient. The diagnostic and identification device of the present invention incorporates extremity sensors to measure physiologic vital signs such as, for example, blood pressure, temperature, heart rate, tonometry, blood oxygen saturation, and/or $pO_2$. The present invention provides a single comprehensive physiology monitoring device without using patch sensors and transducers.

Consequently, the integrated sensory and identification system of the present invention assesses a patient's physiologic status. In fact, the present invention advantageously provides one small device which performs various sensory functions. Therefore, the present invention is easily transported, can continually accompany the patient, and requires fewer resources such as energy than existing sensory mechanisms. Additionally, the present invention cannot be easily removed and thus provides more reliable and timely results.

Significantly, the present invention may also store test results for subsequent retrieval. This helps a care provider or other individual with the ability to view current or past physiologic conditions. More importantly, it helps reduce incidents of incorrect association of results with incorrect individuals. In turn, the present invention improves quality of care by inhibiting problems with mishandling and loss of test results.

Finally, the present invention helps health care providers as well as other individuals retain more accurate diagnostic records. The diagnostic and identification system of the present invention may be equipped to directly transmit patient identification and diagnostic information to a patient record management system, physician digital assistant, tablet PC, or any other device.

In accordance with the invention therefore:

It is one object and advantage of the present invention to provide an integrated diagnostic and identification mechanism.

It is another object and advantage of the present invention to provide an integrated diagnostic and identification system which is difficult to remove.

It is still further object and advantage of yet another exemplary embodiment of the present invention to provide an integrated sensory and identification system which associates physiologic measurements with a specific patient.

It is yet another object and advantage of the present invention to provide an integrated diagnostic and identification system with a locking mechanism which may only be unlocked using a separate key.

It is an object and advantage of one exemplary embodiment of the present invention to automatically unlock the diagnostic and identification system based on extremity sensors.

It is further an object and advantage of another exemplary embodiment of the present invention to store patient information.

It is an additional object of yet another embodiment of the invention to provide a diagnostic and identification system which communicates with a patient record management system or other device.

The above and other objects, advantages and features of the present invention will become more readily appreciated and understood from a consideration of the following detailed description of preferred exemplary embodiments of the present invention when taken together with the accompanying drawings of the present invention.

SUMMARY OF THE INVENTION

In accordance with the foregoing objects, the present invention comprises a diagnostic and identification bracelet that not only monitors an individual's physiology but is also difficult to remove. Advantageously, the present invention provides a single, small, low-cost diagnostic and identification system which is capable of assessing several physiological parameters. In the preferred exemplary embodiment, the diagnostic and identification bracelet is comprised of a material which is resistive to cutting and tearing. Significantly, this resistance to removal prevents any inadvertent or intentional disconnection of diagnostic equipment.

The bracelet of the present invention further comprises a plurality of physiologic sensors such as, for example, heart rate sensor, pulse oximeter, capnometer, and other sensory mechanisms. Since all the sensors are integrated in a relatively small bracelet, an individual's physiologic functions are regularly monitored even when the individual must be transported or during procedures. Additionally, the sensors require fewer resources than existing systems.

In the preferred exemplary embodiment, the acquired data from each diagnostic tool is combined into one consolidated output on the diagnostic bracelet. The results may be accessed via a portable display device or other monitor device connected to the output on the bracelet. In another exemplary embodiment, the diagnostic bracelet further comprises memory to store acquired physiologic measurements. This allows a health care provider or other individuals to access physiologic measurements at regular intervals or when desired.

In other exemplary embodiments of the present invention, the diagnostic bracelet comprises a lock which may only be selectively unlocked using a key. Additionally, in yet another exemplary embodiment, the bracelet automatically unlocks itself based on the profusion of the extremities to which it is attached. Finally, the diagnostic bracelet may further comprise wired or wireless communication technology to access and/or store patient identification as well as physiologic information.

BRIEF DESCRIPTION OF THE DRAWINGS

The following figures are schematic representations of the invention.

DETAILED DESCRIPTION OF THE INVENTION

While various embodiments of the present invention are discussed in detail below, it should be appreciated that the present invention provides inventive concepts that can be embodied in a wide variety of specific contexts. The specific embodiments discussed are merely illustrative of specific ways to make and use the invention, and do not limit the scope of the invention.

Figure 1:
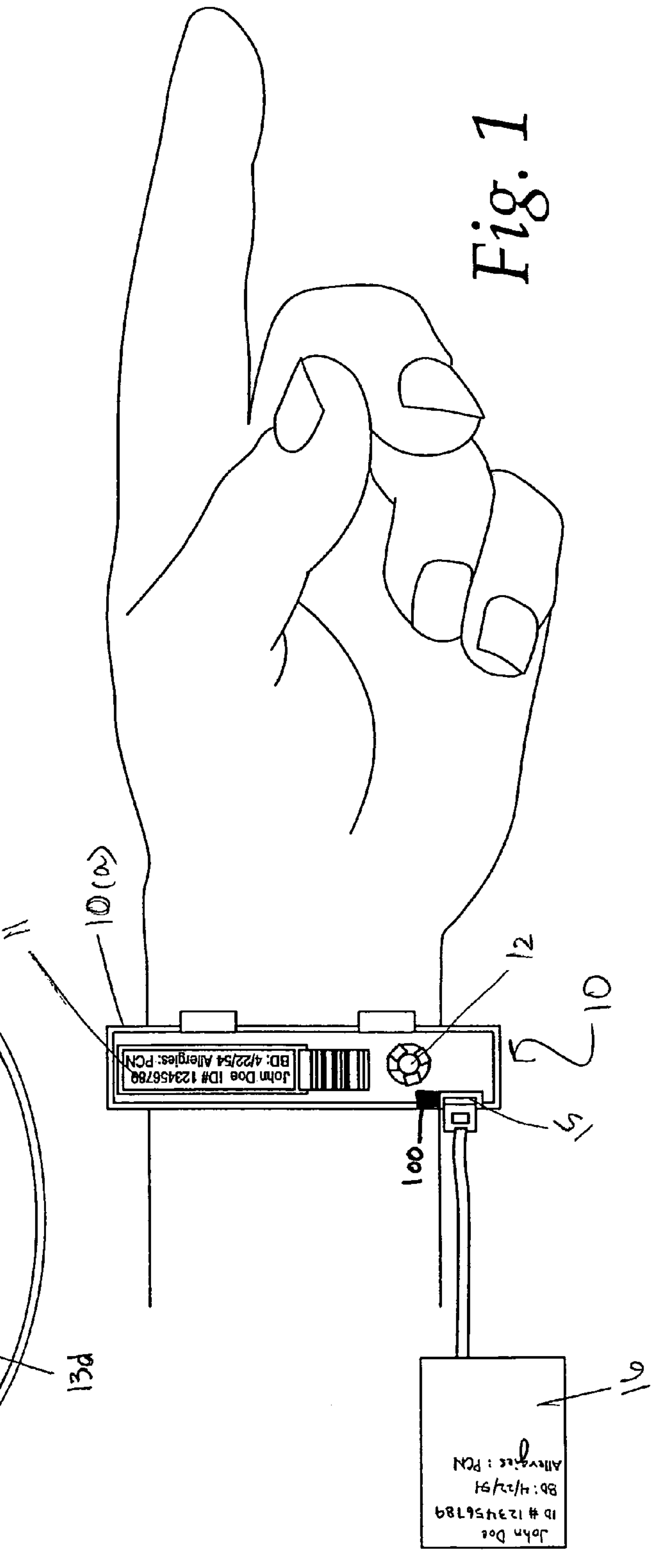
FIG. 1—is a top plan view illustrating the identification bracelet with a viewing device connected to an output.

Turning first to FIG. 1, there is generally shown a small, integrated diagnostic and identification bracelet 10 comprised of a substantially circular band 10*a*. In the preferred exemplary embodiment, the substantially circular band 10*a* comprises any hypoallergenic material which is reasonably resistant to cutting, breaking or tearing. The preferred exemplary embodiment comprises an ergonomically designed strong plastic bracelet 10 which is not only comfortable to wear but also prevents development of skin conditions such as, for example, pressure skin sores. This allows health care providers or others to simply attach a comfortable diagnostic and identification bracelet 10 to a patient as shown in FIG. 1 without being concerned that the bracelet may be inadvertently or intentionally removed.

Figure 2:
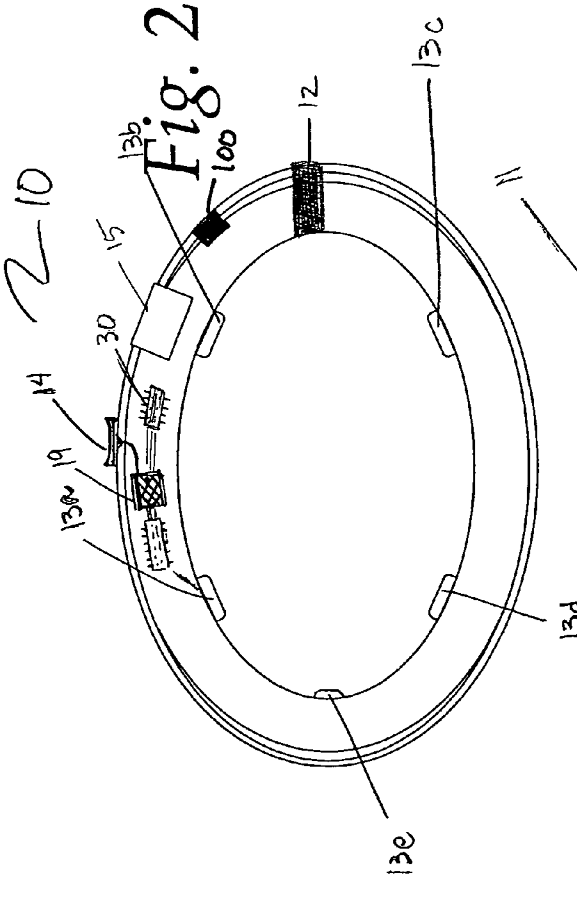
FIG. 2—is a side elevational view illustrating the identification bracelet including various sensory systems.

The diagnostic and identification bracelet 10 further comprises an identification mechanism 11 such as a name tag or a bar code. The identification mechanism 11 allows an individual to simply read or readily identify the individual wearing the bracelet 10. Additionally, it will be appreciated that the identification information may further include an embedded microprocessor or microcomputer 19 as shown in FIG. 2. It is considered that the microcomputer, microprocessor, and other such devices are well known in the computer hardware art. Consequently, such devices are simply indicated as blocks in the figures without more detail.

The preferred exemplary embodiment of the diagnostic and identification bracelet 10 additionally comprises a lock 12 which may be any commonly found lock. For example, a micro-lock may be used. The lock inhibits bracelet removal by securely fastening the bracelet 10 and permits removal only by doctors or workers who posses a key. Moreover, the lock can be re-locked so the bracelet 10 can be removed and re-secured.

Additionally, the diagnostic and identification bracelet 10 comprises a device for tracking the disengagement duration 100 which tracks the duration that the bracelet is disengaged or removed from the user. In the preferred exemplary embodiment, the device for tracking disengagement duration may simply be a timer on the bracelet which is initiated when the bracelet is disengaged. It should be appreciated that any device which is able to track the disengagement duration, preferably unauthorized removal of the bracelet 10 may be used as the device for tracking the disengagement duration 100. The device for tracking disengagement duration 100 may be independent device or may communicate with the microprocessor 19.

As seen in FIG. 2, the diagnostic and identification bracelet 10 comprises various physiologic sensors 13. The preferred exemplary embodiment includes physiologic sensors 13 which use infra-red, lasers, tonometry, proximity, and other existing techniques to monitor physiologic conditions and variations. More specifically, the preferred exemplary embodiment includes such physiologic sensors 13 as a blood pressure monitor 13*a*, a heart rate monitor 13*b*, a pulse oximeter 13*c* as well as either a proximity 13*d* or a profusion sensor 13*e*; none of which require electrodes or other bulky sensory patches commonly found in existing diagnostic equipment. It should be appreciated by those of ordinary skill that other sensors which do not substantially detract from the size of the diagnostic and identification bracelet 10 may also be included. In this manner, the present invention provides a single, small device which not only assesses comprehensive physiological variables and correctly identifies an individual but also reduces the costs and space required by existing sensory systems.

However, it is possible that the diagnostic and identification bracelet may comprise sensors which use small or unobtrusive sensory patches to monitor physiologic conditions. For example, the diagnostic and identification bracelet may comprise small sensors 13 mounted on the outside of the bracelet. Nonetheless, these small external sensors may still be connected to the microprocessor to provide their output.

In the preferred exemplary embodiment, the bracelet 10 comprises a single activation mechanism connected to the aforementioned microprocessor 19. The microprocessor 19 in turn communicates with each physiologic sensor over a bus. However, it should be appreciated that the microprocessor 19 and the physiologic sensors 13 may communicate via a wired or wireless means. For example, short range and long range wireless protocols or known wired communication methods such as over a bus may be utilized. The output of each individual sensor is combined by methods well known in the art to provide a single output 15 to which a viewing device 16 may be connected.

The single output 15 may comprise a serial, universal serial bus, or other such interface. Alternatively, the single output 15 may comprise short range wireless transmission technologies such as, for example, bluetooth technology or longer distance wireless communication technologies such as, for example, 803.11 or cellular technologies. Moreover, the single output 15 may comprise a removable memory media port such as, for example, a secure digital or memory stick port. In addition, the viewing device 16 may comprise any commercially available display device, but preferably a portable display device. This may comprise, for example, a personal digital assistant, smart phone, or any other display device.

In practice, an individual provides a user prompt by simply pushing the activation button 14 and the microprocessor 19 directs the physiologic sensors 13 to obtain the individual's physiologic data. The resulting comprehensive data is then combined and made available for access by the viewing device 16. Please note, however, that the microprocessor 19 may be programmed to either regularly monitor physiological variables at predefined intervals or obtain the data at a pre-defined, desired time. Furthermore, it should be appreciated by those of ordinary skill in the art that the output data may also be automatically associated with the individual's identification information by the present invention.

However, in one exemplary embodiment of the identification bracelet 10, each physiologic sensor includes its own activation mechanism and output. For example, each sensor may comprise its own activation button 14 and an output to which a display device may be connected. It may also be possible to provide a small display such as, for example, a small LCD dedicated to each sensor on the bracelet itself.

In yet another exemplary embodiment of the invention, the diagnostic identification bracelet 10 comprises a memory 30 which stores both patient identification and physiologic data. Additionally, the physiologic sensor data may modify the function of the bracelet itself. For example, if the proximity or profusion sensor determines that a swollen appendage comes in contact with the internal circumference of the bracelet 10 or is a predefined distance from the internal circumference, the microprocessor 19 may operate to automatically unlock the diagnostic identification bracelet 10. Finally, in an alternate exemplary embodiment, the bracelet 10 may communicate the same information with patient information management systems via a wired or wireless communication technology. For example, this advantageously allows the bracelet to automatically update patient records or retrieve the same for on demand display to a care provider or other individual with the viewing device.

Figure 3:
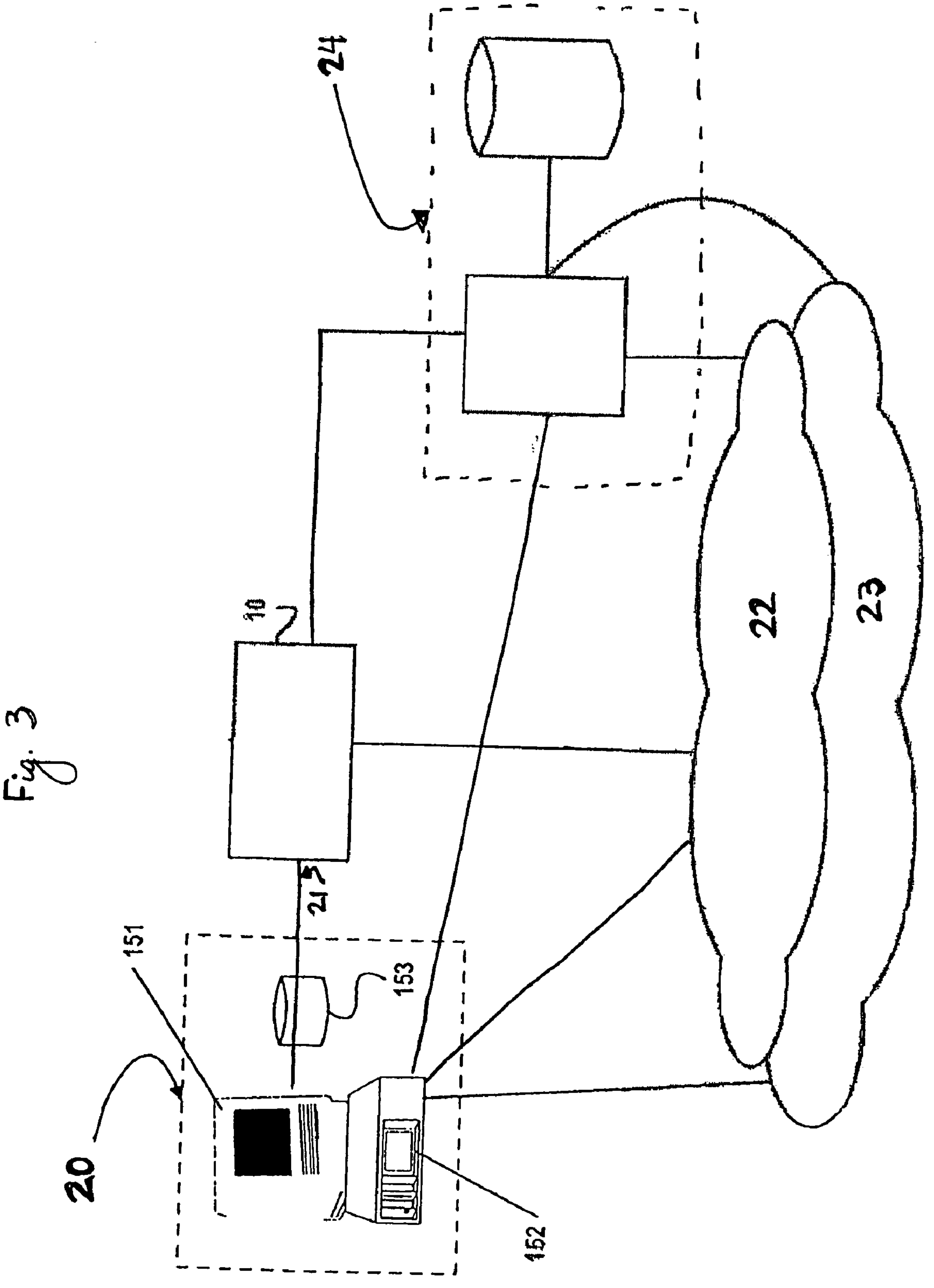
FIG. 3—illustrates a detailed patient information management system in which exemplary embodiments of the invention are implemented.

FIG. 3 illustrates an exemplary embodiment in which the diagnostic and identification bracelet 10 of the present invention may be used in conjunction with a patient record management system 20. A user or health care provider uses the diagnostic bracelet 10 to assess and obtain various physiological variables. Thereafter, the diagnostic bracelet 10 automatically communicates with an available server, computer, storage, or other electronic device with a record management system. The record management system 20 of the preferred embodiment comprises a computer 152 connected to monitor 151 to monitor and modify data. Additionally, the record management system comprises a remote storage device 153 to securely store data.

It should be noted that various hardware and software record management systems are commercially available. Moreover, it should be appreciated that a single device, a personal digital assistant or other device capable of storing data may comprise the record management system. The diagnostic and identification bracelet 10 is coupled to the record management system 20 via a local connector 21, a wired or wireless network 22, the internet 23, a phone system 24, any combination thereof, or any other communication method used to deliver data. As a result, patient records can be regularly and accurately updated. However, it should be noted that the diagnostic and identification bracelet 10 may be programmed to repetitively communicate the physiologic data records to the record management system, transmit the same based on a user indication, or at any desired time period. Alternatively, the patient data may be transmitted via any mentioned communication method to the record management system 20 from the viewing device 16. Finally, the system may be programmed to retrieve patient's records from the system on demand so that such records are displayed to the requester via the viewing device 16.

The specific embodiments discussed in the detailed description are merely illustrative of specific ways to make and use the invention, and do not limit the scope of the invention.

I claim:

1. A diagnostic and identification bracelet comprising, in combination, a substantially toroidal band;

a re-useable lock which joins two ends of said band;

an identification mechanism on a face of said band;

a plurality of physiologic sensors connected to said band;

said identification bracelet being difficult to remove without selectively unlocking said lock wherein said selectively unlocking the lock comprises automatically unlocking the lock based on pre-determined physiologic sensor data, wherein said data is related to a swollen appendage.

2. A diagnostic and identification bracelet as in claim 1, wherein said identification mechanism comprises a name tag.

3. A diagnostic and identification bracelet as in claim 1, wherein said identification mechanism comprises a bar code.

4. A diagnostic and identification bracelet as in claim 1, wherein each one of said physiologic sensors operates independently of the other physiologic sensors.

5. A diagnostic and identification bracelet as in claim 1, wherein at least one of said physiologic sensors comprises a heart rate monitor.

6. A diagnostic and identification bracelet as in claim 1, wherein at least one of said physiologic sensors comprises a pulse oximeter.

7. A diagnostic and identification bracelet as in claim 1, wherein at least one of said physiologic sensors comprises a temperature monitor.

8. A diagnostic and identification bracelet as in claim 1, wherein at least one of said physiologic sensors comprises a proximity sensor to measure the proximity of said diagnostic and identification bracelet to an extremity of a patient.

9. A diagnostic and identification bracelet as in claim 1, wherein said physiologic sensors monitor physiology based on a user prompt.

10. A diagnostic and identification bracelet as in claim 1, wherein said physiologic sensors automatically monitor physiology at a pre-defined interval.

11. A diagnostic and identification bracelet as in claim 1, wherein said selectively unlocking the lock comprises using a key.

12. A diagnostic and identification bracelet as in claim 1, wherein each of said physiologic sensors comprises an individual display.

13. A diagnostic and identification bracelet as in claim 1 further comprising a microprocessor.

14. A diagnostic and identification bracelet as in claim 1, wherein said physiologic sensors can operate in conjunction with at least one other sensor.

15. A diagnostic and identification bracelet as in claim 12, wherein said physiologic sensors comprise a single output.

16. A diagnostic and identification bracelet as in claim 1 further comprising a memory.

17. A diagnostic and identification system comprising, in combination, a substantially circular band;

a re-useable lock which is formed by the combination of two ends of said band;

an identification mechanism attached to a face of said band;

a plurality of physiologic sensors on said band;

a microprocessor within said band coupled to said physiologic sensors and further coupled to a memory within said band;

a display device independent from said band to view the output of said physiologic sensors;

said band being difficult to remove without selectively unlocking said lock wherein said selectively unlocking the lock comprises automatically unlocking the lock based on pre-determined physiologic sensor data, wherein said data is related to a swollen appendage.

18. A diagnostic and identification system as in claim 17, wherein said identification mechanism comprises a name tag.

19. A diagnostic and identification system as in claim 17, wherein said identification mechanism comprises a bar code.

20. A diagnostic and identification system as in claim 17, wherein at least one of said physiologic sensors comprises a heart rate monitor.

21. A diagnostic and identification system as in claim 17, wherein at least one of said physiologic sensors comprises a pulse oximeter.

22. A diagnostic and identification system as in claim 17, wherein at least one of said physiologic sensors comprises a temperature monitor.

23. A diagnostic and identification system as in claim 17, wherein at least one of said physiologic sensors comprises a proximity sensor to measure the proximity of said diagnostic and identification bracelet to an extremity of a patient.

24. A diagnostic and identification system as in claim 17, wherein said physiologic sensors monitor physiology based on a user indication.

25. A diagnostic and identification system as in claim 17, wherein said physiologic sensors automatically monitor physiology at a pre-defined interval.

26. A diagnostic and identification system as in claim 17, wherein said selectively unlocking the lock comprises using a key.

27. A diagnostic and identification system as in claim 17, further comprising a record management system.

28. A diagnostic and identification system as in claim 27, wherein said diagnostic and identification bracelet routinely, automatically communicates with said record management system.

29. A diagnostic and identification system as in claim 27, wherein said diagnostic and identification bracelet communicates with said record management system based on a user indication.

30. A diagnostic and identification system as in claim 29, wherein said diagnostic and identification bracelet is capable of retrieving data from said record management system.

* * * * *